No. 623,626. Patented Apr. 25, 1899.
L. RASCO.
SINK OR BASIN TRAP.
(Application filed July 6, 1898.)
(No Model.) 2 Sheets—Sheet 1.

WITNESSES
A. A. Bonney.
B. W. Williams.

INVENTOR
Levi Rasco,
By his Att'y
Henry Williams

No. 623,626. Patented Apr. 25, 1899.
L. RASCO.
SINK OR BASIN TRAP.
(Application filed July 6, 1898.)
(No Model.) 2 Sheets—Sheet 2.

WITNESSES
A. A. Bonney.
B. M. Williams.

INVENTOR
Levi Rasco,
By his Att'y
Henry W. Williams

THE NORRIS PETERS CO., PHOTO-LITHO., WASHINGTON, D. C.

UNITED STATES PATENT OFFICE.

LEVI RASCO, OF WHITINSVILLE, MASSACHUSETTS.

SINK OR BASIN TRAP.

SPECIFICATION forming part of Letters Patent No. 623,626, dated April 25, 1899.

Application filed July 6, 1898. Serial No. 685,293. (No model.)

*To all whom it may concern:*

Be it known that I, LEVI RASCO, a citizen of the United States, residing at Whitinsville, in the county of Worcester and State of Massachusetts, have invented a new and useful Improvement in Sink or Basin Traps, of which the following is a specification.

This invention or improvement relates to traps for sinks or basins; and the invention consists in the novel construction and arrangement of parts hereinafter described, whereby the trap is rendered self-cleaning, its condition as far as clogging is concerned indicated to the eye, and its parts rendered easily accessible, all as illustrated in the accompanying drawings, in which—

Figure 1:
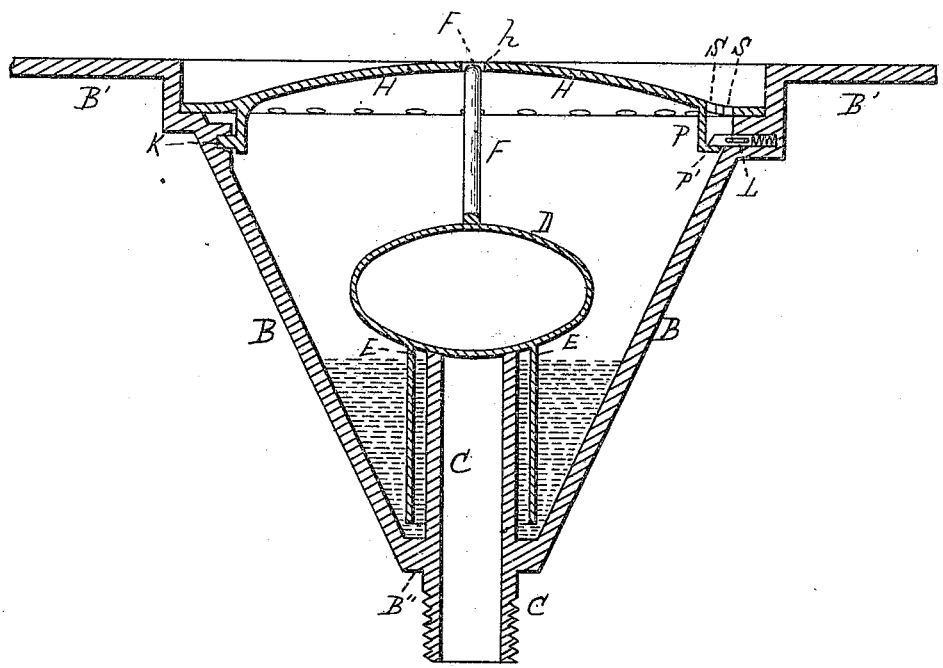
Figure 2:
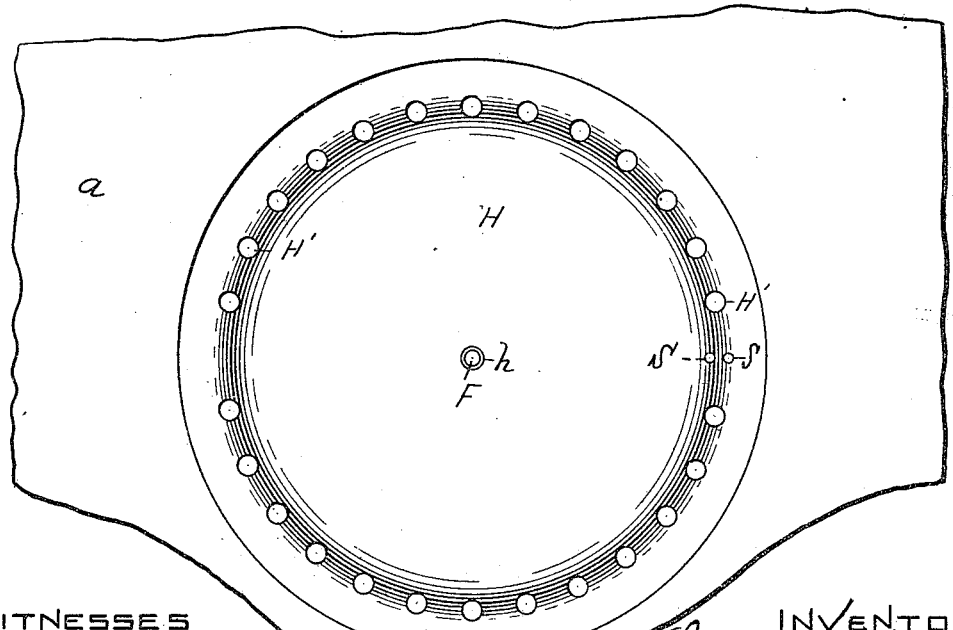
Figure 3:
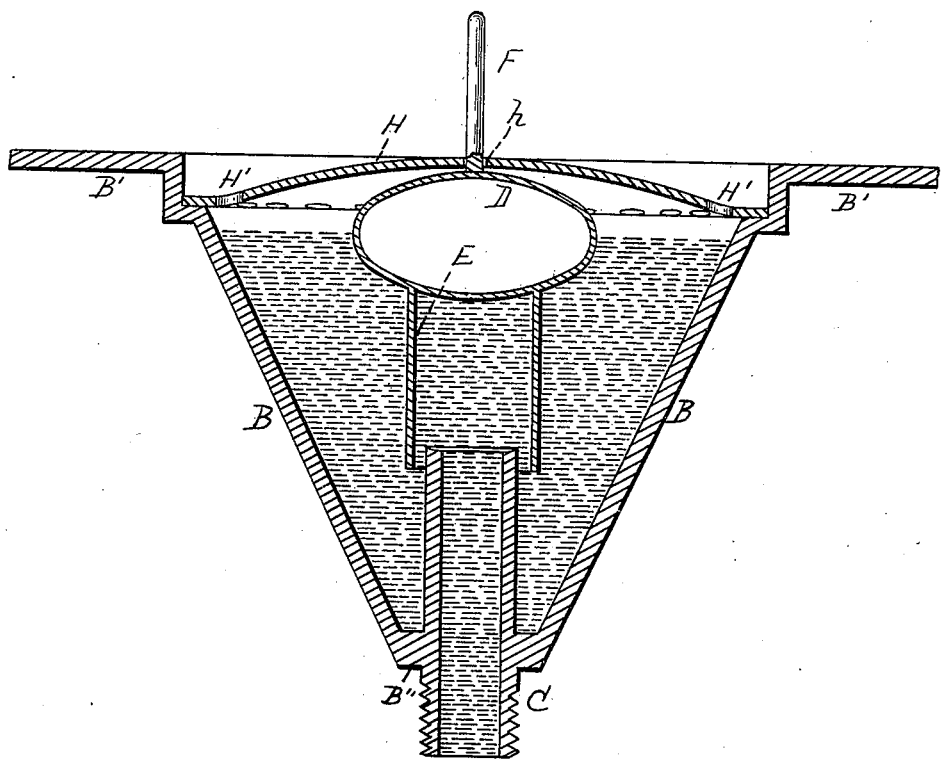

Figure 1 is a central vertical section taken through the trap when in its normal and unclogged condition. Fig. 2 is a plan view of the trap in position in a basin or sink, a portion of which is shown. Fig. 3 is a central vertical section taken at right angles to that illustrated in Fig. 1, the trap indicating that there is an obstruction in the waste-pipe.

Similar letters of reference indicate corresponding parts.

$a$ represents a portion of an ordinary basin or sink.

B' represents the flange, and B the walls of the trap. The flange rests on or makes a part of the bottom of the sink or basin around the waste-opening, and the sides are of a reversed cone shape, as shown, the apex being truncated or cut off, and a vertical pipe C is formed integral with the bottom B'', which connects the sides B of the trap, said pipe being open at both ends and being adapted to connect at its lower end with the waste-pipe. The pipe C being of less diameter than the bottom B'', an annular space is left within the trap at the extreme lower end of the side B around said pipe.

D is a float made, preferably, of the shape shown—that is to say, hollow and flattened, so as to rest on the upper end of the pipe C or float on the surface of the water without rolling—and E is a downwardly-extending pipe made integral or rigid with the float and of sufficient diameter to extend from the lower side of the float around the pipe C and leave an annular space between it and said pipe. This pipe E is of such a length as to extend almost but not quite to the wall B'' when the float is seated on the pipe C. Rigidly secured to or integral with the float and extending vertically from the upper surface thereof is the telltale-spindle F. This spindle extends through a central opening $h$ in the cover H, which is provided near its edge with a ring of openings H'.

The normal position of the parts is indicated in Fig. 1, in which the water seals the trap, but does not lift the float off the upper end of the pipe C. The upper end of the telltale-spindle F is level with the cover H, and thus indicates that there is no obstruction in the pipe or trap. In Fig. 3 the waste-pipe is obstructed and the water has risen in the trap, lifting the float, so that the telltale projects for nearly its entire length through the cover.

The parts being in their normal position, as shown in Fig. 1, when sufficient water passes through the sink into the trap to lift the float off its seat the water passes between the pipes C and E and thence through the former into the waste-pipe. At the same time—*i. e.*, while the water is passing through the trap—the float and telltale rotate or whirl rapidly, thus indicating that the passage is free and the water is passing rapidly through it. Should the pipe be clogged so that the water cannot pass through, the float and telltale would not whirl and the trap would begin to fill. The whirling of the float serves not only to call attention to the free condition of the water-pipe, but also by rotating the pipe E to set the water in motion around the pipe C, and thus prevent any solid matter therein from settling near the bottom B''. This is accomplished by the rapid passage of the water through the trap. When the water begins to pass through the trap, the float D is of course lifted off the pipe C. While in such position, the float is sustained solely by the water which rushes rapidly by and around it, and as it is impossible that the water should strike the float with absolute evenness and in an absolutely vertical direction without the least deflection it has a tendency to whirl or rotate the float. Inasmuch as the float is relieved from the friction of the upper end of the pipe C and is prevented from tipping over by the spindle F, which serves as a hub having its bearings in the hole $h$, the whirling or rotation of the float is quickly produced by the circular movement of the water and continues with accelerating speed as long as the water continues to pass through the trap. That water in a washbasin as it approaches and passes through the vent in the bottom thereof has a tendency to a whirling or circular movement is a matter of common knowledge. The lifting and whirling of the float brings the spindle into notice not only because it projects through the hole $h$, but because it is in motion when in such position and by reason of such motion more quickly attracts the eye. Moreover, inasmuch as it has a little play within the opening $h$ the ear is attracted by the rattling of the spindle therein and also by the rattling of the float D against the under surface of the cover H and the pipe E around the pipe C.

The cover H is held in position on one side by the projection K, which extends into a corresponding opening in the side B of the trap, and on the other side by a spring-latch L, which extends horizontally from a suitable recess in that side of the trap over a horizontal lip or flange P', extending outward from a bracket P, made integral with the cover. The beveled end of the latch L allows the cover to be pushed down into position. In order to remove the cover, however, it is necessary to insert a pin or key through one of the perforations S in the cover and push the latch back.

Having thus fully described my invention, what I claim, and desire to secure by Letters Patent, is—

In a sink and basin of the character described, the trap proper comprising the flange B', side walls B, bottom B'' and vertical pipe C; the cover H provided with a central perforation $h$, horizontal projection K adapted to extend into a corresponding opening in the side of the trap, the bracket P provided with the lip or flange P', and openings S; the spring-latch L extending from the trap over said flange P' and beneath the openings S; the float D; the pipe E extending down from said float around said pipe C; and the spindle F extending up from said float into the opening $h$, substantially as described.

LEVI RASCO.

Witnesses:
JEREMIAH WM. HORAN,
JOHN F. O'LEARY.